E. H. SCHULZ.
DIAPHRAGM BLAST METER.
APPLICATION FILED OCT. 25, 1918. RENEWED APR. 9, 1920.
1,344,722.
Patented June 29, 1920.
2 SHEETS—SHEET 2.
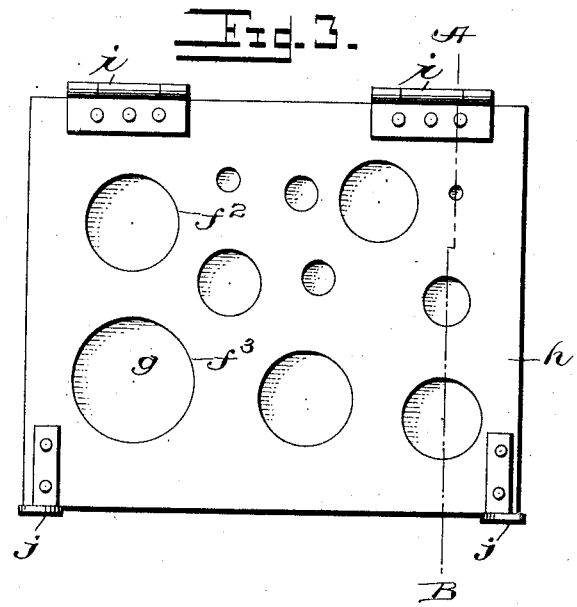
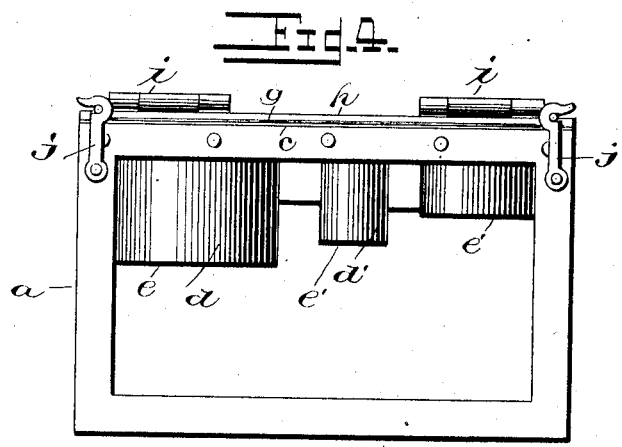
Inventor
E. H. Schulz

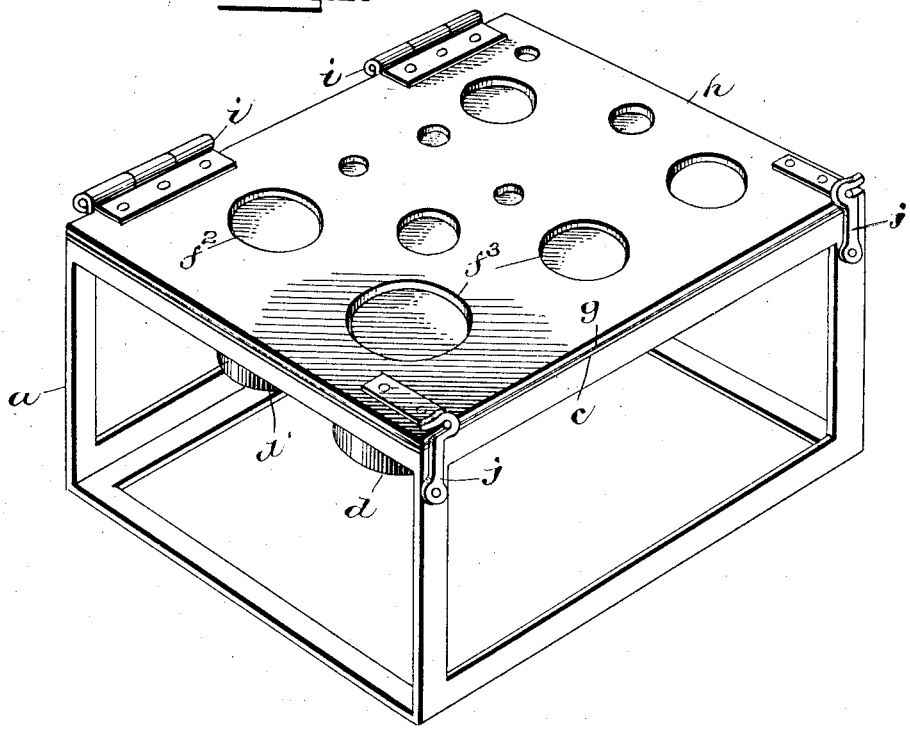
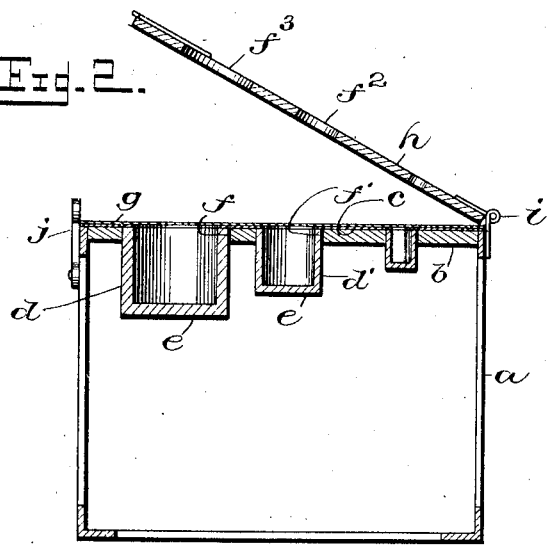

UNITED STATES PATENT OFFICE.

EDWARD H. SCHULZ, OF THE UNITED STATES ARMY.

DIAPHRAGM BLAST-METER.

1,344,722.  Specification of Letters Patent.  Patented June 29, 1920.

Application filed October 25, 1918, Serial No. 259,713. Renewed April 9, 1920. Serial No. 372,600½.

(FILED UNDER THE ACT OF MARCH 3, 1883, 22 STAT. L., 625.)

*To all whom it may concern:*

Be it known that I, EDWARD H. SCHULZ, corps of engineers, a citizen of the United States, stationed at Milwaukee, Wisconsin, have invented an Improvement in Diaphragm Blast-Meters, of which the following is a specification.

The invention described herein may be used by the Government, or any of its officers or employees in prosecution of work for the Government, or by any other person in the United States, without payment of any royalty thereon.

My invention relates to improvements in blast-meters or blast-measuring instruments, in which the blow of suddenly developed gaseous pressure, is measured by the action on, or destruction of diaphragms of paper, parchment, or other materials, said diaphragms covering tubes or recesses which have openings either square, circular or other shape, and which tubes or recesses may be either open or closed at the opposite ends. Such a blast meter is to be of cubical or any other shape and to have one or several external surfaces, each fitted with a series of recesses of various sizes.

My invention relates to an instrument which may be placed in the vicinity of explosive charges, and particularly near guns of large caliber, for the purpose of determining the relative dynamic effect or energy of the blast, either direct or back blast, caused by the sudden detonations of explosives in gases, shells, or elsewhere, or by the close passage of a shell or projectile in flight, and also for measuring necessary sudden changes in atmospheric pressure due to hurricane and high wind velocity. The actual measure of blast is determined by comparison with standard blast and pressure meter, see Patent No. 931348.

The instrument will also measure accurately the strengths of various parchments or diaphragm materials, or other fabrics, when exposed to blast under certain definite conditions.

More specifically the object of my invention is to provide an instrument of the above character which may be used to accurately determine the force of blast at different distances and directions from the center of disturbance, and also to enable the intelligent comparison of the force of different explosions.

The instrument will be found especially useful in determining the blast effect on the material and personnel in the vicinity of seacoast guns, military works, dugouts, magazines, turrets, searchlights, etc., and in determining concussions of the atmosphere produced by different explosions.

To this end, my invention consists in the construction and arrangement of parts hereinafter described and illustrated in the accompanying drawings in two sheets, in which:

Figure 1, is an isometric drawing, illustrating the type of apparatus used, having a front surface filled for the blast tests, but which may have back or side surface also prepared for blast tests.

Fig. 2, is a section taken through the meter.

Fig. 3, is a top view of the meter.

Fig. 4, is a front view or elevation of the meter.

The principle which I employ is based upon the breaking, fracture or destruction of a definite sized diaphragm, covering a recess of air, or other gas, which in the present instance was not connected with the normal atmosphere, but separated therefrom by the diaphragm, made of any suitable material, which in the present instance was scratch pad paper, No. 4039. The principle is based on the further fact, that the energy of the blast (just sufficient to break a certain sized diaphragm) is inversely proportional to the area of the diaphragm. The blow or blast on any square unit at any point is further directly proportional to the strength of the explosion or other focus of explosion, and approximately inversely proportional to the cube of distance from the focus of explosion. The energy of the blast is also dependent on the direction of the blast, that is, whether the line joining the origin or focus of explosion with the meter, is perpendicular or oblique to the surface of the diaphragm, or whether the meter is entirely in a blast shadow.

The force or breaking power of the blast on any certain diaphragm is also determined by the character of recess, whether open or closed, and dependent on the size or capacity of the recess.

The facts may be further explained in connection with the description of the operation of the instrument.

Referring to the drawing in detail my apparatus comprises:

A box or vessel ($a$) of metal or other suitable material, which box may be closed or in skeleton form if desired, in which one or more faces such as ($b$) are provided with openings $f$, $f'$ of certain various determined diameters or areas; of a pad ($c$) which covers the surfaces ($b$), said pad having corresponding openings, $f$, $f'$ etc., to agree with openings in surface ($b$), the purpose of said pad being to give an equal contact on the diaphragm; in case of perfectly fitted or ground surfaces, this pad may be omitted; of tubes or recesses $d$, $d'$ having closed bottoms $e$, $e'$ or open bottoms as may be determined; of a diaphragm ($g$) of paper, parchment, leather, metal, or other suitable material, which is placed on the pad ($c$) and covers the tubes or openings $f$, $f'$, and is held in place by a cover ($h$) of metal or other suitable material, said cover being hinged at ($i$) and held in place by ($j$) and thus clamped tightly over the diaphragm; or the cover ($h$) may be tightly held over the surfaces by screw bolts or other means, independently of hinges and hasps, but in any case the cover ($h$) is removable at will for the withdrawal and insertion of the necessary diaphragm for each test. Said cover ($h$) also has openings $f$, $f'$; corresponding and agreeing with openings in surface ($b$) and pad ($e$).

The method of using the instrument and its principle of operation will now be explained.

The instrument as shown in Fig. 1, is placed at any desired point, at which the force of explosion is to be measured, and may be placed on the ground or suspended at any angle. A sheet or diaphragm material is then placed and clamped in position on each face or surface intended to receive such diaphragm. Note is made of the quantity and character of explosive and direction and distance from the meter, also of any other conditions such as wind, intervening bodies, etc., affecting the result or contributing to the blast. When so set and placed, the meter is ready to receive the blast; as soon as the explosion occurs or as soon thereafter as practicable, the meter covers are opened or taken off, and the diaphragm sheet removed and number and size of hole punctured is noted, and the sheet preserved for future record.

It will be found as a rule that several openings in diaphragm will be punctured beginning with the largest. The smallest opening punctured or destroyed will be an index of the blow. By grading the size of openings very uniformly and with small variations its degree of blow can be accurately determined; thus if the smallest hole broken is $\frac{1}{4}''$ diameter, with paper #4039, then the force of the blow is approximately 187.5 ft. lbs. per sq. ft. or 1.3 ft. lbs. per sq. in. of diaphragm surface at that point. If the smallest hole is $1''$ diameter, then the blow is 11.7 ft. lbs. per sq. ft., or .08 ft. lbs. per sq. in.

If there are several holes of same size and all break uniformly there is additional confirmation of the accuracy of the reading. If the blow, on a surface normal to the direction of blast origin is desired, the instrument can be so set and oriented; if the blow on back surface or side, or top or bottom surface is desired, it can be obtained by orienting the meter, or placing suitable diaphragm surfaces on various sides of the meter.

As soon as an explosion is made and diaphragm read and recorded, the instrument is ready for another reading, by inserting and clamping another piece of diaphragm material.

If it is desired to obtain simultaneous readings at different points or distances from a certain focus of explosion, all that is necessary is to have sufficient number of meters so placed and set with similar paper diaphragm material, or the relative strength of the diaphragm material known.

If it is desired to test certain known quantities of new explosives, it can be done by placing a definite charge at a definite distance, and under conditions similar to other previously tested charges of a standard explosive, and thus the relative strength of various explosives can be determined.

In the same way with a definite known quantity and type of explosive, various diaphragm materials can be tested and their strengths determined with relation to the standard diaphragm material. Also other materials such as silks, parchments, fabrics, and other materials can be tested as to strength against sudden blast or concussion of the air.

The function, purpose and uses of the diaphragm blast meter are:—

($a$) To measure the intensity of blast or blow of gaseous pressure, for certain positions and distances; due to explosions of certain chemicals or explosives or gun discharges. The measure of blast is determined by comparison with a standard blast and pressure meter as described in Patent No. 931,348.

($b$) To measure the relative intensities of blast of various chemicals or powders, or gun discharges.

($c$) To measure the blast or air shock due to shell travel, or gaseous vibratory disturbance.

(d) In above cases to measure the blast, not only the direct normal blow, but also the back blow, or any component of the same, depending on the special orientation or position of the receiving surface of the blast meter.

(e) To measure the strength of papers, parchments, fabrics or other material by subjecting them to the blast of certain known explosives at certain distances.

(f) Other conditions being the same, the measure of the blast at the particular point where the meter is placed in all of the above cases, is determined by the character of diaphragm material used and by the size of the smallest opening that is destroyed or punctured, the material used being predetermined as to strength.

What I claim is:—

1. A blast meter providing a surface having openings of different sizes, said surface adapted to receive a diaphragm, and means for clamping the diaphragm in place.

2. A blast meter, including a surface having openings therein, and adapted to receive a diaphragm, and a plate having openings adapted to register with the first mentioned openings, and means for clamping the plate on the surface to hold the diaphragm in place.

3. A blast meter including a surface having openings therein, a covering of yielding material for said surface and having apertures adapted to register with the openings, the said covering providing a seat for a diaphragm, and means for clamping the diaphragm in place.

4. A blast meter, including a plate having recesses, the said plate providing a seat for a diaphragm, and a cover hinged to the plate and having apertures adapted to register with the recesses and operable to clamp the diaphragm in place.

In witness whereof, I have signed my name to this specification in the presence of two witnesses, this the eighth day of October, nineteen hundred and eighteen.

EDWARD H. SCHULZ.

Witnesses.
PHILIP W. CUSTAL,
KENNETH H. SHERMAN.